Patented Sept. 17, 1946

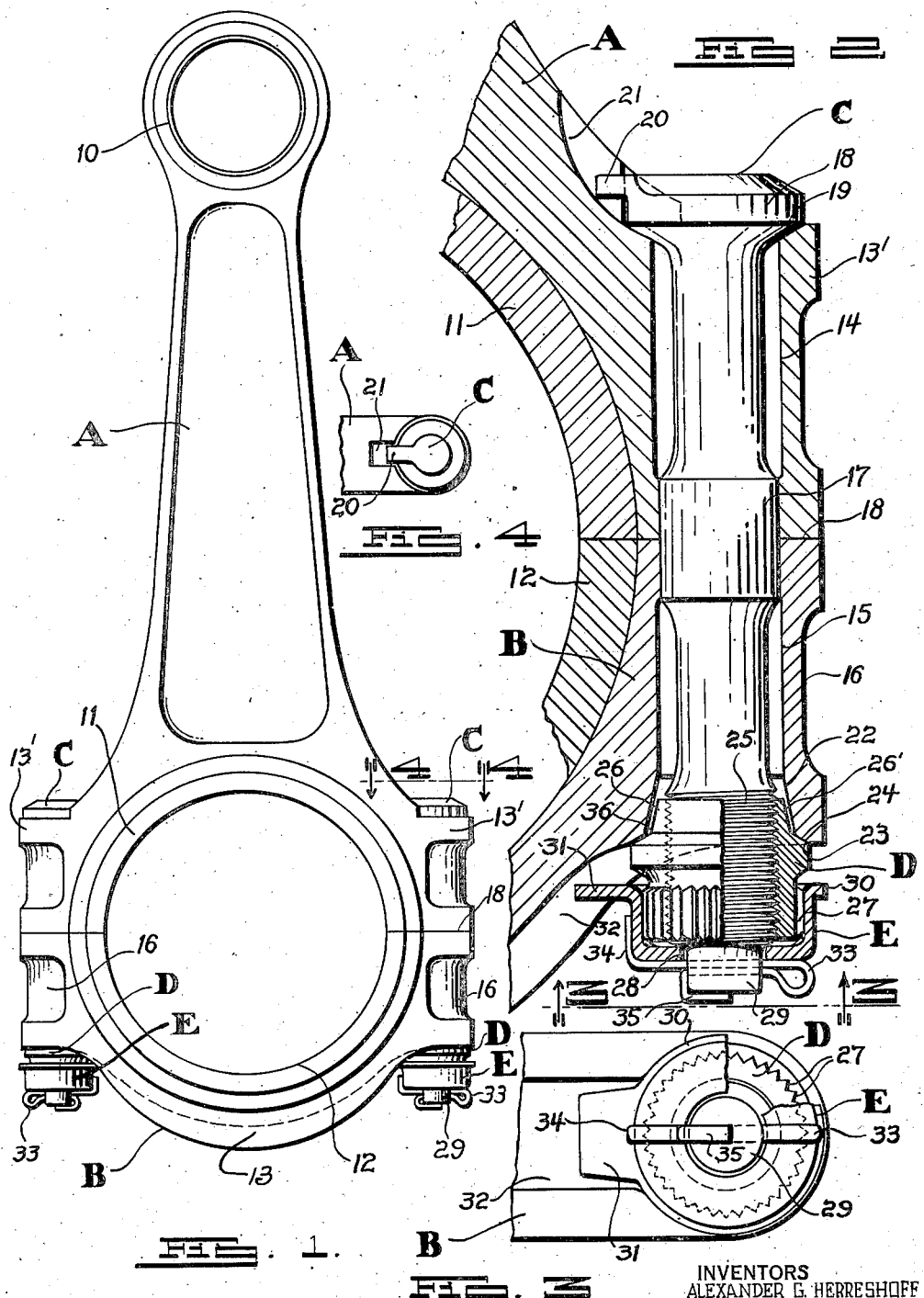

2,407,928

UNITED STATES PATENT OFFICE 2,407,928

FASTENING DEVICE

Alexander G. Herreshoff, Grosse Pointe, and Wade Lamb, Detroit, Mich., assignors to Chrysler Corporation, Highland Park, Mich., a corporation of Delaware Application October 30, 1941, Serial No. 417,171

9 Claims. (Cl. 85—1)

1

This invention relates to fastening or securing devices for connecting together component parts of machines, machine elements, or other structures.

An object of our invention is to provide a relatively simple and effective fastening device capable to taking high stresses in securing the parts together and in maintaining them in predetermined assembled relationship.

Another object is to provide a threaded fastener of the nut and bolt type wherein the load at the threads is efficiently distributed to prevent objectionable stress concentrations.

A further object is to provide a fastening device having a relatively simple and effective locking means for maintaining the parts in assembled relationship against danger of the fastening device releasing its connection.

An additional object is to provide an improved locking means for a fastener of the nut and bolt type adapted to accommodate stressing of the bolt within close limits and maintaining such relationship without danger of the fastening device releasing its hold on the parts fastened together.

Further objects and advantages reside in the novel combination and arrangement of parts as more particularly hereinafter described and claimed, reference being had to the accompanying drawing in which:

Fig. 1 is a front elevational view of a connecting rod assembly showing our fastening device applied thereto.

Fig. 2 is an enlarged sectional view of a portion of the Fig. 1 connecting rod taken to illustrate our fastening device.

Fig. 3 is a bottom plan view illustrating the locking means, the view being taken as indicated by line 3—3 of Fig. 2.

Fig. 4 is a top plan view taken as indicated by line 4—4 of Fig. 1.

Referring to the drawing we have illustrated our invention as applied to an aircraft engine connecting rod having a main body portion A and bearing cap B. The portion A has the usual piston pin bearing portion 10 at one end and the half-bearing portion 11 at the other end for receiving the crankshaft throw. A companion half-bearing 12 is formed in cap 13, it being desired to tightly assemble the cap and portion A together as illustrated in Fig. 1.

The portion A is provided with bosses 13' each having an opening 14 therethrough in alignment with an opening 15 extending through a boss 16 of cap B. As the two fastening devices are identical, the description of one will serve to illustrate the complete assembly. A bolt C extends through openings 14 and 15 and has a pilot portion 17 engaging portions of openings 14, 15 adjacent the face engagement of cap B with rod portion A as at 18.

At one end each bolt C has a head 18 seated at abutment 19 formed on the upper end of a boss 13', this bolt head having a lateral finger 20 projecting into the groove 21 of portion A thereby allowing ready installation of bolt C downwardly but holding the bolt against rotation in either direction.

The lower end portion of opening 15 is formed with a frusto-conical portion 22 which extends downwardly and outwardly to merge with a second frusto-conical portion 23 of a wider cone angle and adapted to provide a seat for a correspondingly formed portion 24 of a nut D. The lower end of bolt C is threaded at 25 along a portion which extends both into the opening 15 within the frusto-conical portions 22, 23 and also downwardly beyond opening 15.

The nut D has threaded engagement with bolt threads 25 and is formed with a frusto-conical upper end portion 26 which extends inwardly beyond seat 24 so as to extend with clearance at 26' along and within portion 22. The lower end portion of the nut D has its outer side bounding wall formed with a circumferential series of relatively fine contiguously arranged external serrations 27 projecting radially outwardly therefrom for engagement with similar serrations formed internally on the axially extending side wall of a cupped locking cap E.

The cap E overlies the lower end of nut D by a portion formed with an opening 28 to accommodate projection therethrough of the reduced end 29 of bolt C. Cap E is provided with a stiffener flange 30 elongated laterally at one point to provide a finger 31 of such width circumferentially as to always enable it to enter a downwardly open groove or recess 32 in assembling the cap on serrations 27 which serrations are of such spacing relative to the widths of recess 32 and finger 31 so as to enable assembly of the cap irrespective of the relative positions rotatably between nut D and recess 32.

The bolt end 29 has a transverse opening therethrough to receive a cotter pin 33 to lock the cap in position, one end portion 34 of this pin being bent upwardly to lie along the cylindrical wall portion of cap E toward flange 30 while the other end portion 35 is return-bent around the end of bolt portion 29.

In use, the rod cap B is positioned in place with respect to main portion A and the crankshaft throw and bolts C applied downwardly to receive a nut D. A wrench of appropriate design to fit serrations 27 is then applied to nuts D and the desired amount of tension is placed in bolts C, each nut seating at 23 with self-centering action for the nuts and bolts. When the desired stress has been reached, the lock cap E is applied to each nut so that its finger 31 projects into a recess 32 whereby the nuts are held in their positions. Then the cotter pins 33 are applied and the ends 34, 35 bent into locking position as illustrated. The parts A and B are thus securely fastened together without danger of accidental disconnection or loosening although, when desired, the parts may be readily disassembled.

By utilizing the outer annular side wall of the nut D for serrated connection with cap E, a large number of serrations of simple fluted formation is accommodated thereby enabling locking connection between the nut and cap for very small increments of rotation of nut D on bolt C. Where it is desired to stress the bolt C within very close limits, as required in aircraft engine practice, our invention provides a means for locking the nut D when adjusted to very close limits of rotation with resulting stressing of the bolt to exacting specifications.

Heretofore, with conventional designs, there has been a tendency for the threads of the nut adjacent its seat to crowd into the bolt and unduly concentrate the load in such vicinity, thereby resulting in failures in the material especially at the juncture of the nut seating portion with the nut body portion. With our arrangement, the nut portion 26 is to some extent unloaded by allowing this portion to expand outwardly from its threads, this action being produced as an incident to forcing the nut on the reaction-taking conical seat 23, and by making the portion 26 of suitable reduced wall thickness, along with providing clearance at 26'. Furthermore, the lines of force do not concentrate at the region 36 but instead extend somewhat spaced between seat 24 and the threads within nut portion 26, the taper of portion 26 being such that its thickness diminishes toward its upper end where progressively less lines of force need to be accommodated or where progressively less strength of the nut is needed. Further, our arrangement is such as to approximately uniformly load the nut threads along the length of the nut.

Our fastening means may, of course, be employed to assemble parts of structures other than the connecting rod parts shown for purposes of illustrating the principles of our invention. All references to terminology of position such as is used in our specification and claims is used in a relative sense as obviously the fastening device may extend in the opposite or any other direction from that illustrated.

If desired, the companion seating surfaces 23, 24 may be mating parts of spherical surfaces instead of frusto-conical although the latter arrangement is preferred from the standpoints of manufacture and stress characteristics. In either event the opening 15 may be said to be provided with a flared seating portion as at 23 and the seating portions of the nut D and opening 15 are complementary with each other in the sense that they are identically flared so as to provide the desired seating area.

We claim:

1. In a fastening device, a reaction-taking member having an opening formed with a frusto-conical seat portion, an abutment, a tension-taking element extending into said opening for seating at one end portion thereof on said abutment, the other end portion of said element having threads one portion of which extend for a distance along said element inwardly of said opening beyond said frusto-conical seat portion and another portion of which extend for a distance outwardly beyond said opening and said frusto-conical seat portion, a circumferentially continuous nut having threaded engagement with the threads of said element, said nut having a first portion thereof disposed within said opening and engaging said one portion of said threads, said nut having a second portion engaging said another portion of said threads, said nut having a frusto-conical seating portion intermediate its said first and second portions adapted to seat on the frusto-conical seat portion of said reaction-taking member such that said first and second portions of said nut extend in opposite directions beyond said seat portion of said opening.

2. In a fastening device according to claim 1, said nut first portion being spaced within said opening and externally tapered so as to provide progressively diminishing wall thickness thereof in a direction inwardly of said opening from the frusto-conical seating portion of said nut.

3. In a fastening device according to claim 1, said nut first portion being spaced with appreciable clearance within said opening.

4. In a fastening device, a reaction-taking member having an opening formed with a flared seat portion, an abutment, a tension-taking element extending into said opening for seating at one end portion thereof on said abutment, the other end portion of said element having threads one portion of which extend for a distance along said element inwardly of said opening beyond said flared seat portion and another portion of which extend for a distance outwardly beyond said opening and said flared seat portion, a circumferentially continuous nut having threaded engagement with the threads of said element, said nut having a first portion thereof disposed with appreciable clearance within said opening and engaging said one portion of said threads, said nut having a second portion engaging said another portion of said threads, said nut having a flared seating portion intermediate its said first and second portions adapted to seat on the flared seat portion of said reaction-taking member, said flared seating portions being complementary with each other.

5. In a fastening device, a first member having a portion thereof formed with an opening bounded at one end thereof by an abutment, a second member having a portion thereof formed with an opening aligned with the aforesaid opening and having a flared seating portion, a bolt extending through said openings and having one end thereof seated on said abutment, said bolt having threads formed adjacent its opposite end, and a circumferentially continuous nut having a portion intermediate its length flared complementary with and adapted for seating on the flared seating portion of said second member, said nut having inner and outer end portions thereof respectively projecting in opposite directions from said intermediate flared portion and formed with threads engaging the threads of said bolt whereby said bolt may be tensioned by said nut, said inner end portion of said nut being spaced within the opening of said second member such that the threads of the inner end portion of said nut are approximately uniformly loaded when said bolt is tensioned by said nut.

6. In a fastening device, a reaction-taking member provided with a recess, an abutment, a tension-taking element seated at one end thereof on said abutment and having a portion adjacent its other end threaded, a nut engaging said threads and adapted to seat on said reaction-taking member for tensioning said element, said nut having an externally serrated annular side wall adjacent an end portion thereof, and a locking cap cupped for receiving the end portion of said nut, said cap having a finger projecting therefrom for entering said recess, said cap having an annular wall portion internally serrated for engagement with the serrations of said nut, said finger and recess being so constructed and arranged as to maintain said nut against rotative movement with respect to said reaction-taking member.

7. In a fastening device according to claim 6, said tension-taking element having its said other end formed with an opening extending transversely therethrough, said cap having an opening through which the last said end of said element projects, and a retaining pin engaging said opening and disposed to hold said cap in position on said nut.

8. In a fastening device, a first member having a portion thereof formed with an opening and bounded at one end thereof by an abutment, said member being formed with a recess adjacent said opening, a second member having a portion thereof formed with an opening aligned with the aforesaid opening, a bolt extending through said openings and having one end thereof seated on said abutment, means for locking said bolt with one of said members so as to prevent rotation of the bolt relative to each of said members, said bolt having a portion adjacent its other end threaded, a nut engaging said threads and seated on said second member for tensioning said bolt thereby to fasten said members together, said nut having an annular side wall portion thereof formed with a circumferential series of contiguously disposed serrations extending in the direction of the axis of said bolt, and a locking element engaging said serrations and having a portion thereof projecting into said recess thereby to prevent undesired rotation of said nut relative to said second member and bolt.

9. In a fastening device, a reaction-taking member, an abutment, a tension-taking element seated at one end thereof on said abutment and having a portion adjacent its other end threaded, means carried by said one end of said element for holding said element against rotation relative to said abutment, a nut comprising a body having an opening extending axially therethrough and provided with threads engaging the aforesaid threads, said body having a portion adapted to seat on said member for tensioning said element, said body having an outer circumferentially extending side bounding wall adjacent an end portion thereof, said wall being formed with an annular series of contiguously arranged serrations projecting radially outwardly therefrom, and a cupped locking cap comprising a portion extending transversely of said element and formed with an opening axially therethrough through which said other end of said element projects, said cap having an annular side wall extending from its said first portion in a direction axially of said cap opening for receiving therewithin the said end portion of said nut body, said annular side wall of said cap being formed with an annular series of contiguously arranged serrations projecting radially inwardly therefrom for engagement with the serrations of said nut thereby to non-rotatably connect said nut with said cap, and means for anchoring said cap against rotation.

ALEXANDER G. HERRESHOFF.
WADE LAMB.